United States Patent [19]

DeFrees

[11] 4,013,096

[45] Mar. 22, 1977

[54] LOADING AND UNLOADING VALVE MECHANISM FOR TRANSPORTATION TANK

[76] Inventor: Joseph H. DeFrees, 505 Liberty St., Warren, Pa. 16365

[22] Filed: Nov. 28, 1975

[21] Appl. No.: 635,809

[52] U.S. Cl. .......................... 137/612.1; 251/144; 285/22
[51] Int. Cl.² ...................................... F16K 19/00
[58] Field of Search ...................... 137/608, 612.1; 251/145, 144; 285/22, 189

[56] References Cited

UNITED STATES PATENTS

| | | | |
|---|---|---|---|
| 1,349,594 | 8/1920 | Wafer et al. | 137/608 X |
| 1,472,265 | 10/1923 | Bell | 137/608 X |
| 2,981,556 | 4/1961 | Jackson | 285/22 |
| 3,029,833 | 4/1962 | DeFrees | 137/414 |
| 3,148,704 | 9/1964 | Blass | 137/612.1 |
| 3,464,447 | 9/1969 | Jones | 137/608 |

FOREIGN PATENTS OR APPLICATIONS

| | | | |
|---|---|---|---|
| 70,777 | 7/1959 | France | 137/612.1 |
| 90,684 | 3/1897 | Germany | 137/612.1 |

Primary Examiner—Alan Cohan
Assistant Examiner—Gerald A. Michalsky
Attorney, Agent, or Firm—Baldwin, Egan, Walling & Fetzer

[57] ABSTRACT

A fabricated valve for use in loading a transportation storage tank with liquid, such as for instance gasoline or oil, and providing for coupling of the valve with a compatible loading coupler of a loading station used in loading the liquid into the transportation tank. The valve includes an outlet assembly portion for unloading liquid from the transportation tank. The valve is of relatively light weight, is economical to manufacture, and possesses large flow areas which cuts friction losses and turbulence of the liquid during loading and unloading operations.

11 Claims, 7 Drawing Figures

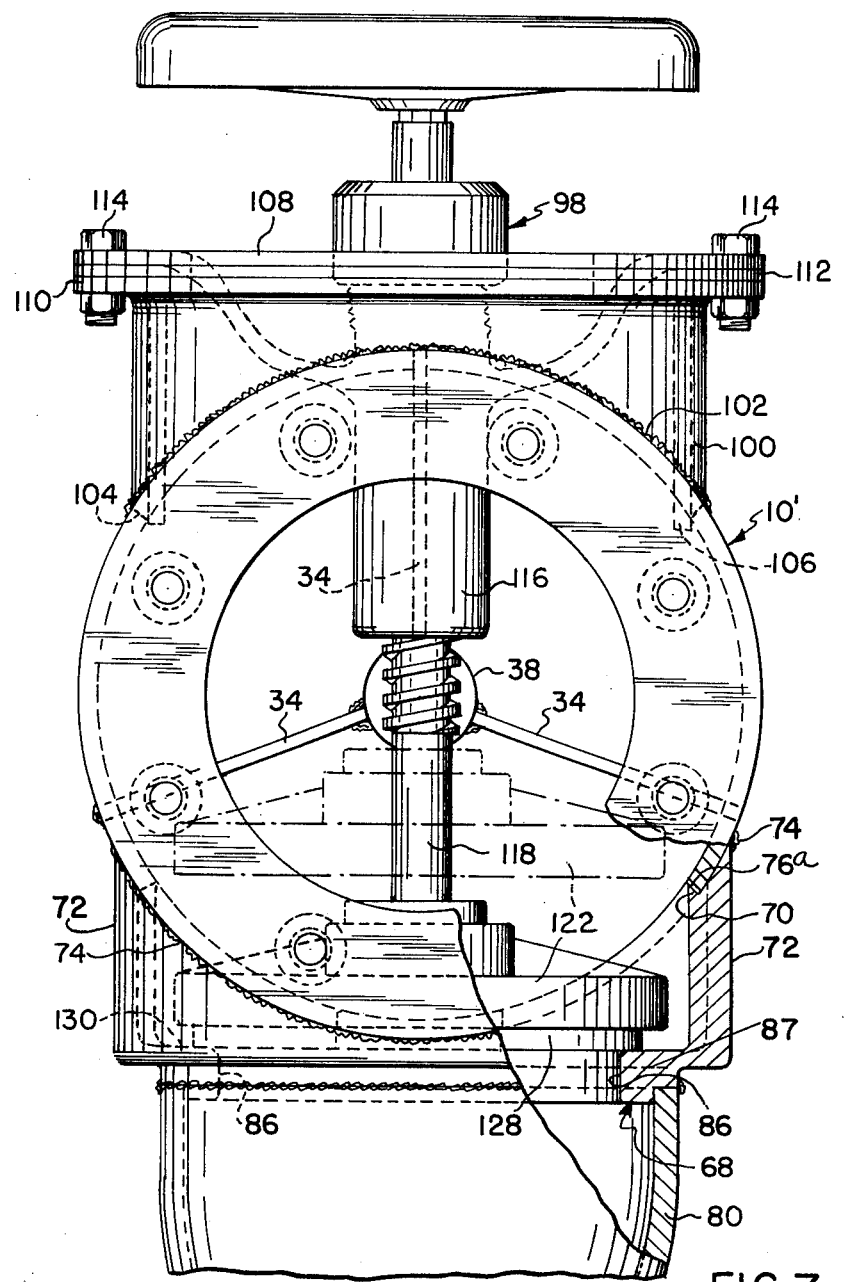
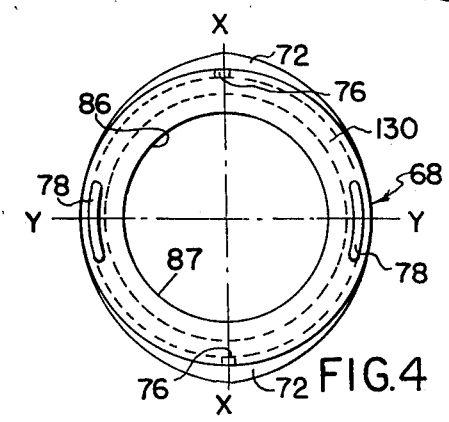
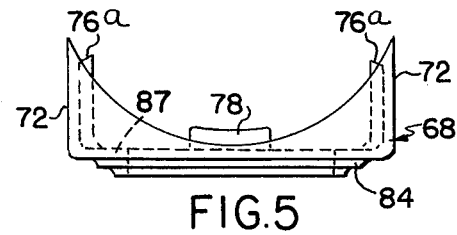

LOADING AND UNLOADING VALVE MECHANISM FOR TRANSPORTATION TANK

Various arrangements of valves are known in the prior art for the loading and unloading of a transportation tank. However, many times these valves require undue maintenance, are often times quite heavy thereby cutting into the carriable load of the transportation tank, possess a structure which results in considerable friction losses and turbulence upon loading or unloading of the transportation tank, and/or do not permit complete drainage of the liquid being loaded into or unloaded from the tank upon termination of the operation.

SUMMARY OF THE INVENTION

The present invention provides an adapter valve arrangement of fabricated construction which is of relatively few, lightweight parts and which effectively provides for the loading of liquids into a transportation tank and the control of the unloading of the liquid from the transportation tank.

Accordingly, an object of the invention is to provide a novel loading-unloading adapter valve for use with a transportation tank for liquids, such as inflammable liquids.

Another object of the invention is to provide a valve of the aforementioned type which is lightweight, of relatively small size, and which is of fabricated construction.

Another object of the invention is to provide a loading-unloading valve structure which results in lower friction losses and turbulence, and greater efficiency and higher loading rates, as compared to heretofore known valves, as well as a valve which facilitates drainage upon completion of the loading or unloading operation.

A still further object of the invention is to provide a loading-unloading adapter valve arrangement which includes an internal poppet wherein the poppet is accessible for repair from outside of the valve without removing the valve from the tank vehicle, or requiring the necessity of taking the valve apart, and wherein in one embodiment the valve embodies a valve means manually actuatable from exteriorly of the valve, for controlling the discharge of liquid from the storage tank via the valve.

Other objects and advantages of the invention will be apparent from the following description taken in conjunction with the accompanying drawings wherein:

BRIEF DESCRIPTION OF THE DRAWINGS

FIG. 4 is a reduced size, top plan view of a transition fitting member utilized in the outlet assembly of the loading-unloading adapter valve shown in FIGS. 2 and 3.

FIG. 5 is an end elevational view of the transition fitting of FIG. 4.

FIG. 7 is a partially broken end view of the valve of FIG. 6, taken generally along the plane of line 7—7 of FIG. 6 looking in the direction of the arrows.

BRIEF DESCRIPTION OF PREFERRED EMBODIMENTS

Figure 1:
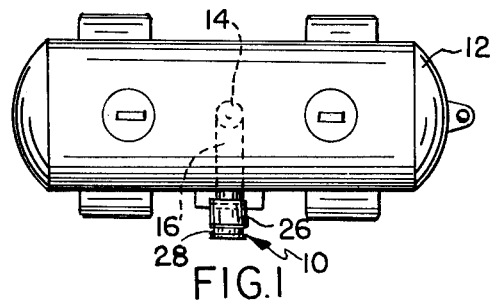
FIG. 1 is a top plan, diagrammatic illustration of a typical installation of a loading-unloading adapter valve of the invention on a transportation tank vehicle.

Referring now again to the drawings, there is shown diagrammatically in FIG. 1 a loading-unloading adapter valve 10 embodying the invention, and mounted on a liquid transportation tank 12. Associated with the lower portion of the tank may be an emergency valve 14 of known construction, such as for instance the type illustrated in U.S. Pat. No. 3,029,833 to Joseph H. DeFrees dated Apr. 17, 1962. The emergency valve 14 may be coupled by means of a conduit or line 16 to the loading-unloading adapter valve structure of the invention, with line 16 having a flange 18 thereon (FIG. 2) adapted for coupling to the flanged portion 20 of the adapter valve. Flange 18 of line 16 may be coupled as by means of threaded fasteners 22 received in complementary threaded openings 24 (FIG. 3) in the flange portion 20, and a sealing gasket 24a or the like is preferably provided between flanges 20 and 18.

As can be seen, the loading-unloading adapter valve structure is preferably of fabricated construction, and includes a body portion 26 of preferably cylindrical or generally round tubular configuration, and which is provided with openings therein as will be hereinafter discussed in greater detail, for mounting various parts forming the complete loading-unloading adapter valve assembly.

Attached to one end of the tubular body portion 26 is a coupling section 28 preferably having an exterior configuration as established by the American Petroleum Institute, and which is adapted for mating coaction with a compatible loading coupler of a conventional loading station for liquids to be transported by the storage tank 12, and wherein the liquid under pressure is adapted to be transmitted via the loading-unloading valve structure 10 into the tank 12 when the coupling portion 28 is coupled to the source of liquid, during bottom loading of the tank. Coupling portion 28 is preferably such that it will couple with all existing loading couplers of the usual loading station for liquids to be transported by the tank vehicle 12.

Disposed interiorly of the body portion 26 is a preferably fabricated spider 30, for movably mounting a poppet valve 32 thereon. Poppet valve 32 is adapted to be opened by the conventional means associated with the loading coupler at the loading station, and which manually opens the poppet upon coupling of the loading coupler to the coupling section 28 of the valve structure. Upon disengagement of the loading coupler from the coupling section 28, the poppet 32 is adapted to automatically close.

Figure 3:
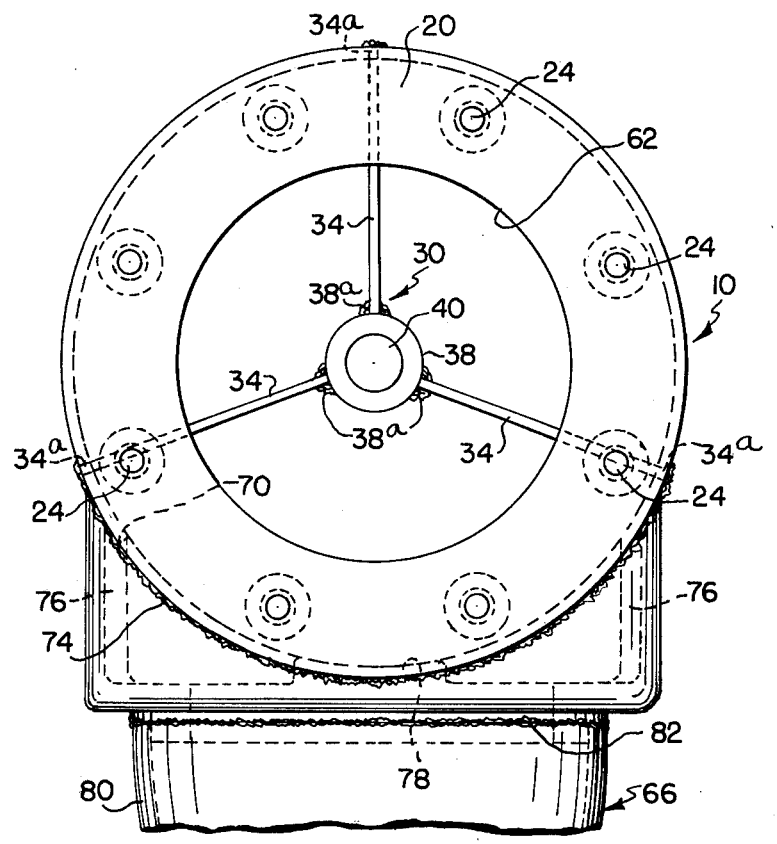
FIG. 3 is a broken end view of the valve taken generally along the plane of line 3—3 of FIG. 2, looking in the direction of the arrows.

Spider 30, in the embodiment illustrated, comprises three arms 34 (FIG. 3) each of which has a tab 34a (FIG. 2) formed on the exterior distal end thereof, which is received in a complementary opening 36 in the body 26, for supporting the spider on the body. Arms 34 are web-like, relatively thin structure, and support a sleeve 38 secured thereto as by welds 38a (FIG. 3). Sleeve 38 receives in sliding, guiding relation, the elongated cylindrical base stem 40 of the poppet 32. A compression spring 42 coating between the rear face 44 of the poppet head 46 and the well 48 formed by arms 34, urges the poppet valve toward closed condition. In phantom lines there is shown the maximum open position of the distal end of the poppet stem 40, when the poppet is opened its maximum amount, the latter being limited by engagement of the poppet head 46 with the forward end of the sleeve 38. Pin 49 may be used to secure the head 46 to stem 40, and an opening 50 may be provided in the poppet stem 40, which can receive therethrough an elongated pin (not shown) for locking or holding the poppet in open position. Upon insertion of the pin through opening 50, the removable pin will coact with the rearward end of sleeve 38, to hold the poppet open.

Figure 2:
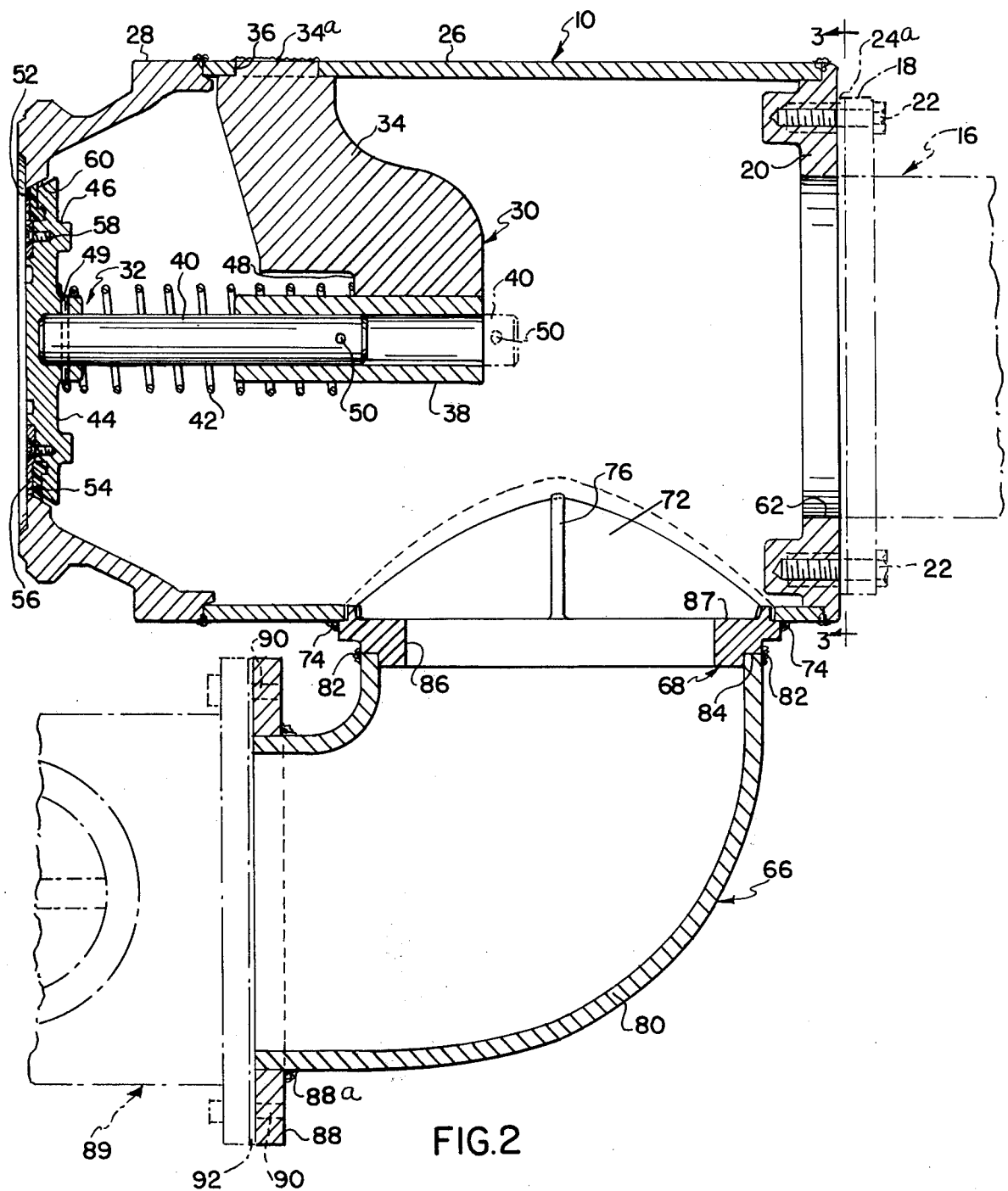
FIG. 2 is a vertically sectioned, enlarged, elevational view of the loading-unloading adapter valve embodying the invention.

Poppet head 46 may be provided with a circular recess 52 on the front face thereof, in which is disposed a sealing ring 54, held in position, in the embodiment illustrated, by retainer disc 56, which in turn is removably secured as by means of threaded fasteners, such as screws 58. Sealing ring 54 is adapted for sealing coaction with the deep tapered defining surface of the liquid entry opening 60, in the coupling portion 28 of the valve. As can be seen in FIG. 2, the axis of liquid entry opening 60 in the valve is preferably generally aligned with the axis of liquid exit opening 62 in rear flange portion 20 of the valve.

It will be apparent that access to the sealing ring 54 is readily accessible from exteriorly of the valve, thus providing for replacement of the sealing ring if necessary. The deep tapered defining surface of the liquid inlet opening 60 into the valve, helps to prevent the poppet from binding during opening movement of the poppet valve away from the liquid entry opening. Also, such a deep tapered seat aids in still providing a seal with the poppet head in the event that the sealing ring 54 is damaged or inadvertently lost.

Spider 30 effectively maintains the poppet valve in centered position in the interior of the body of the loading-unloading valve structure, and in alignment with the liquid inlet opening 60, and presents little interruption to volume flow through the valve. With the axis of the liquid exit opening 62 being disposed in alignment with the axis of the inlet opening, relatively little frictional resistance and turbulence results during liquid flow, thereby providing greater efficiency and higher loading rates for the valve.

In accordance with the invention, the valve includes an outlet assembly 66 (FIGS. 2 and 3) for unloading liquid from the tank 12 when desired. Unloading outlet assembly 66 includes a transition fitting 68 which is disposed in an outlet opening 70 formed in body 26 of the valve. Transition fitting 68 comprises a ring-like member (in plan) having arcuate side wall portions 72 (FIG. 4) which reach their maximum height adjacent one transverse axis X—X of the fitting, and which walls diminish in height to substantially zero adjacent the other transverse axis Y—Y of the fitting (FIGS. 4 and 5). Transition fitting 68 is received in outlet opening 70 and is secured therein in liquid tight relation as by means of welds 74 (FIGS. 2 and 3).

Vertically elongated locater lugs 76 are preferably provided adjacent the plane of axis X—X which locator lugs preferably have a notched top surface, as at 76a, for coaction with the defining body wall edge at the opening 70 in the body portion 26 of the valve, for positioning the transition fitting in the opening and providing for effective attachment by the aforementioned welds 74 to the body portion. Also generally arcuate, horizontally elongated locating lugs 78 (FIGS. 2, 3 4 and 5) are provided adjacent the axis Y—Y of the transition fitting 68, for expeditiously locating the transition member with respect to the bottom opening 70 in the body portion. As can be seen from FIG. 2 and 3, the transition fitting is secured to the body portion so as to be disposed in generally depending relation with respect thereto.

Outlet assembly 66 includes a curved elbow member 80, secured as by welds 82 to the transition member 68, the latter embodying a shoulder 84 thereon which is adapted for receiving the adjacent end of elbow 80. Welds 82 extend completely circumferentially about the transition member and secured elbow 80, and seal the elbow 80 to the transition member in liquid tight relation. Exit port 86 in base wall portion 87 of the transition member communicates the interior of the valve body 26 with the interior of the elbow 80, with the port 86 being generally axially aligned with the vertical axial center of the opening 70 in body portion 26.

Elbow 80 has the flange 88 secured to the distal end thereof, as by means of welds 88a, with the flange 88 being adapted for coupling to a control valve 89 (shown in phantom) or to discharge hose, for transmitting liquid from the tank via exit port 86 in the outlet assembly 66, to the valve 89 or aforementioned hose. In FIG. 2 valve 89 has been shown as attached by means of threaded fasteners coacting with threaded openings 90 in the flange 88 of the valve 10 to secure a valve to the flange. A gasket 92 may be provided between the valve 89 and the flange 88, for securing the latter in liquid tight relation.

The exterior configuration of valve 10 is generally such as to aid in preventing accumulation of ice and dirt on the outside of the valve, while the transportation tank 12 is in use conveying liquids.

The valve parts from which the valve assembly is fabricated are preferably formed of some lightweight material, such as for instance aluminum, which increases the net workload of liquid product that the mobile transportation tank 12 is able to carry, and makes a more economical arrangement of transportation tank.

When it is desired to bottom load the tank vehicle 12, a loading arm or loading hose is attached to the coupler section 28 of the valve 10, and when the conventional control lever on the loading coupler is actuated, it automatically pushes open the poppet 32 in the valve body 26, thus opening the valve to flow of liquid material from the supply source. Spider 30 serves as a vortex breaker and facilitates the smooth flow of liquid into the transportation tank. The liquid flows via the liquid inlet opening 60 in the valve and out outlet opening 62, and thence through the line 16 to the transportation tank.

When the aforementioned control lever on the loading coupler at the loading station is closed, the spring 42 on the poppet of the valve automatically moves the poppet head 46 to closed condition in opening 60. Such arrangement provides a dry disconnect so that no liquid is lost upon disconnecting the loading coupler from the coupling section 28 of the valve assembly 10. It will also be observed that no liquid is able to inadvertently collect or be retained in the valve body 26 upon completion of the loading assembly, since any such liquid found in the valve which is not moved into the transportation tank, will flow by gravity into the outlet assembly 66, and more particularly into the elbow 80 thereof, where it will be retained until such time as discharge from the transportation tank is accomplished, or the valve 89 coupled to the end of the outlet assembly is opened. In this event, when it is desired to unload the transportation vehicle, the manual control valve 89 may be actuated to open the outlet assembly and permit the liquid to flow from the tank 12 through the outlet assembly via exit port 86, and to the desired location.

Figure 6:
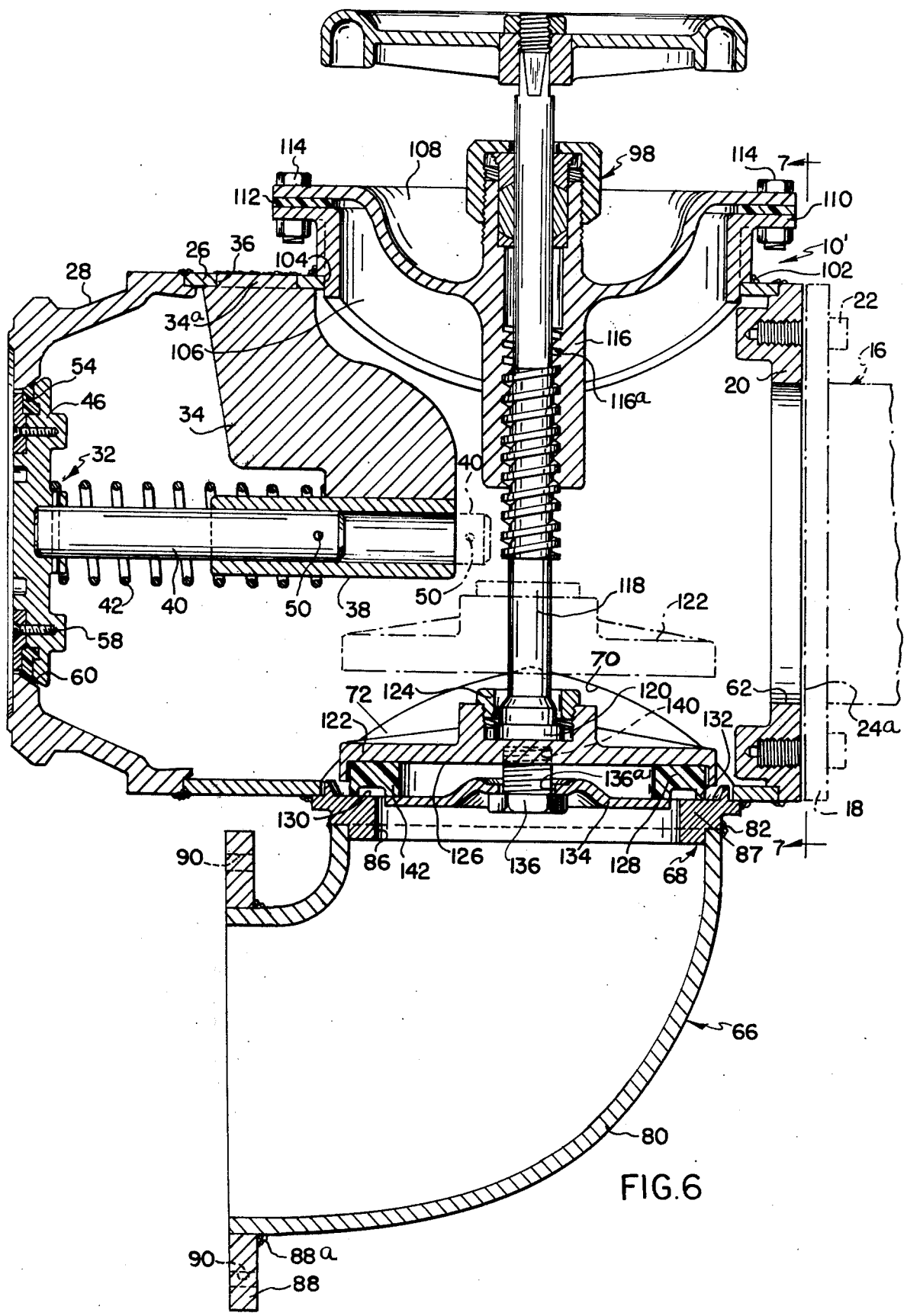
FIG. 6 is an enlarged vertically sectioned view of a modified form of a loading-unloading adapter valve embodying the invention.

Referring now to FIGS. 6 and 7, there is shown another embodiment 10' of loading-unloading adapter valve, which includes a manually operable valve means 98, adapted for opening and closing the exit port 86 in transition fitting 68 in the valve. In this connection, the body portion 26 of the valve 10' includes a top collar 100 which may be welded as at 102 in a top opening 104 in the body portion 26 of the valve. The collar 100 preferably has an inner skirt portion 106 thereon, which is received in the upper opening 104 and overlaps the peripheral edge of opening 104. This aids in maintaining a fluid tight connection between the collar 100 and the body portion upon welding of the collar to the body portion.

The valve means 98, which in the embodiment illustrated is a globe valve, is mounted on the collar 100, with the valve means 98 including a top bonnet 108, mounted on lateral flange 110 of the collar 100, with a sealing gasket 112 disposed therebetween. Fastening means 114, such as the threaded fasteners illustrated, fasten the bonnet in liquid tight relation to the collar.

The bonnet 108 includes a body portion 116 supported in generally depending relation and which is threaded as at 116a, and receives therethrough in coacting relation, the threaded stem 118 of the valve means 98. Stem 118 includes a headed section 120 (FIG. 6) which is received in coacting relation with valve disc 122, and is generally loosely held thereto by means of a threaded collar 124.

Disc 122 includes a circular recess 126 on its underside, and receives therein a ring-like (in plan) valve seal 128 which may be formed of resilient material, such as for instance "Teflon," for sealing the exit port 86 in the transition fitting 68 of the outlet assembly. In this connection, the upwardly facing surface 130 of the transition fitting is of generally ring-like configuration in plan, as can be best seen in FIG. 4, and which circumscribes the exit port 86 of the transition fitting. Seat surface 130 is adapted for sealing engagement by the aforementioned valve seal member 128, for sealing the interior of the body 26 of the valve from the output assembly 66.

Seal member 128 preferably has a resilient lip 132 thereon, which enhances the sealing characteristics thereof, with the seal being held in place by means of retainer plate 134 secured as by means of a threaded bolt 136 passing through an opening 136a in the plate 134, and coacting with a threaded opening 140 in the underside of valve disc 122. Removal of the fasteners 114 holding the bonnet, permits removal of the bonnet 108 to provide accessibility to replace the seal 128 of the valve member 98. Retainer plate 134 engaging depending ring portion 142 on the seal 128 aids in urging the lip portion 132 into tight sealing relation with the seat surface 130.

Bottom loading of a transportation tank with the valve 10' is the same as previously discussed in conjunction with the first described embodiment, while unloading can be controlled by means of the valve means 98 coacting with the valve seat surface 130. A discharge hose or the like can be coupled to the flange 88 of the outlet assembly 66 and the liquid can flow by gravity past the opened valve 98 (shown in phantom lines in FIG. 6) through the exit port 86 and through the elbow 80 and into a discharge hose (not shown) thus controlling the flow of product from the transportation tank. Of course, the flange 88 of the outlet assembly could also be coupled to a control valve (e.g. 89) similar to the first described embodiment.

By providing suitable markings on the upper end of the stem 118 of the rotatable valve 98, the amount that the valve is open can be readily ascertainable by merely looking at the valve after actuation made by the handle portion thereof.

From the foregoing description and accompanying drawings it will be seen that the invention provides a novel loading-unloading adapter valve which enables convenient bottom loading and unloading of a liquid transportation tank, and which is relatively lightweight and compact in construction, and which can be expeditiously manufactured. In one embodiment of the loading-unloading valve structure, manual valve means is embodied therewith for manually controlling the unloading of liquid from the transportation tank.

The terms and expressions which have been used are used as terms of description and not of limitation, and there is no intention in the use of such terms and expressions of excluding any equivalents of any of the features shown or described, or any portions thereof, and it is recognized that various modifications are possible within the scope of the invention claimed.

What is claimed is:

1. A fabricated adapter valve for use in loading and unloading a transportation storage tank comprising, a hollow body portion, a coupling portion secured to one end of the body portion in liquid-tight relation, said coupling portion having a liquid inlet opening therein, said coupling portion being adapted for coupling to a compatible loading coupler of a liquid loading station for the tank, a coupling flange secured in liquid-tight relation to the other end of said body portion adapted for coupling to a liquid flow conduit to the tank, said flange defining a liquid exit opening therein for flow of liquid through said valve, said body portion having a liquid exit opening formed therein, an outlet assembly secured to said body portion at said liquid exit opening therein adapted for unloading liquid from the tank, said outlet assembly including a transition fitting having a base wall portion with a port therethrough, said fitting being secured in liquid-tight relation to said body portion at said liquid exit opening therein, said port communicating said outlet assembly with the interior of said body portion, said transition fitting comprising a ring-like member in plan having arcuate side walls which reach a maximum height adjacent one transverse axis of said ring-like member and projecting outwardly from said base wall portion thereof and which diminish to substantially zero height adjacent another transverse axis of said ring-like member disposed generally perpendicular to the first mentioned axis, said body portion being of generally cylindrical tubular configuration, said port of said fitting being generally axially aligned with the axial center of said exit opening in said body portion, weld means securing said transition fitting to the exterior of said body portion in said liquid-tight relation, said transition fitting including locater lugs for positioning said fitting in said exit opening of said body portion for attachment of said fitting to said body portion, and wherein said locater lugs include opposed vertically elongated lugs disposed on the interior of said side walls at the first mentioned transverse axis coacting in locating relation with the periphery of said exit opening in said body portion, and including other opposed lugs on said fitting projecting outwardly from said base wall portion at said other transverse axis, the last mentioned lugs being adapted for locating coaction with the periphery of said exit opening in said body portion, said locator lugs being disposed interiorly of said transition fitting and in non-interfering relation to said port thereof.

2. A valve in accordance with claim 1 wherein said inlet opening of said coupler portion has a deep tapered defining surface, a poppet mounted in said body portion for controlling the closing and opening of said inlet opening, said puppet having sealing means coacting with the poppet head, and having a taper thereon generally complementary to the taper on said defining surface of said inlet opening.

3. A valve in accordance with claim 2 wherein said poppet includes an elongated mounting stem, a spider mounted in said body portion slidingly mounting said stem therein and positioning the poppet in operative position for coaction with said inlet opening of said coupler portion, said spider being operative to aid in controlling the flow of liquid from said inlet opening to said exit opening in said flange as it passes through said body portion.

4. A valve in accordance with claim 1 wherein said base wall portion of said transition fitting includes a valve seat circumscribing said port and facing in a direction interiorly of said body portion, said other locater lugs being generally arcuate in plan and curving to opposite sides of said other transverse axis, an actuatable valve means including a valve head disposed interiorly of said body portion and adapted for sealing engagement with said valve seat surface, for sealing said port in said transition fitting against egress of liquid from the interior of said body portion into said outlet assembly, and said valve means including a controller extending exteriorly of said adapter valve for controlling the engagement and disengagement of said valve head with said valve seat surface.

5. A valve in accordance with claim 4 wherein said controller includes a stem, and said valve head being secured to said stem, said stem extending exteriorly of said body portion, in liquid-tight relation, and having a handle thereon for controlling actuation of said valve means from exteriorly of said adapter valve.

6. A valve in accordance with claim 5 wherein said body portion has an aperture therein generally opposite the side thereof on which said transition fitting is secured, a collar projecting from said aperture in liquid-tight relation and secured to the exterior of said body portion by weld means, said collar supporting thereon said valve means, said valve means including a bonnet having an elongated body section in which is threadedly received said valve stem, said bonnet including an inwardly sloping web positioning said bonnet body section inwardly of said valve body portion in generally depending relation thereby decreasing the outward extension of said stem and associated handle relative to said valve body portion, and said bonnet being supported by said collar, sealing means coacting between said body section and said stem for resisting leakage of liquid along said stem from interiorly of said body portion, said transition fitting being disposed adjacent the lowermost area of said body portion for communicating the interior of said body portion with the interior of said outlet assembly upon raising of said valve head from sealing engagement with said seat surface of said transition fitting by threaded rotation of said stem relative to said bonnet body section.

7. A valve in accordance with claim 6 wherein said valve head has a removable sealing ring coacting therewith, said sealing ring being adapted to be positioned by said head into sealing relation with the confronting valve seat surface of said transition fitting upon predetermined rotational actuation of said stem of said valve means.

8. In combination a storage tank and a control valve structure for controlling the flow of liquid into and from the tank, and including an emergency valve coacting with the tank preventing accidental discharge of liquid from said tank, said control valve structure comprising a fabricated valve member including a hollow body portion having a coupling portion secured to one end of the body portion in liquid-tight relation, said coupling portion being adapted for coupling to a compatible loading coupler of a liquid loading station, for transmitting liquid from the latter via said valve member to said tank, said valve member comprising a coupling flange secured in liquid-tight relation to the other end of said body portion and removably coupled in liquid-tight relation to a liquid conduit communicating with said emergency valve, said flange defining an exit opening therein, said coupling portion having a liquid inlet opening therein, said coupling portion having a liquid inlet opening therein, poppet valve means mounted in said body portion for automatically closing said inlet opening upon termination of liquid flow to said inlet opening, said poppet valve means including a head and an elongated mounting stem projecting outwardly from said head thereof, a spider mounted in said body portion slidingly mounting said stem therein and positioning said poppet head in operative position for coaction with said inlet opening, said body portion having a liquid exit opening formed therein, and an outlet assembly secured in liquid-tight relation to said body portion at said liquid exit opening therein, for controlling the flow of liquid from said tank, said outlet assembly including a transition fitting defining an exit port therein, said transition fitting having a base wall portion with said port extending therethrough, and weld means securing the transition fitting to the exterior of said body portion in liquid-tight relation, for communicating the interior of said body with the interior of said outlet assembly via said port, said transition fitting comprising a ring-like member in plan having arcuate side wall portions which extend outwardly from said base wall portion and which reach their maximum height adjacent one transverse axis of said ring-like member and which diminish to substantially zero height adjacent another transverse axis of said ring-like member disposed generally perpendicular to the first mentioned axis, said body portion being of generally cylindrical tubular configuration with said transition fitting engaging said body portion adjacent said exit port therein with said port of said fitting being generally axially aligned with the axial center of said exit opening in said body portion, said transition fitting including integral locater lugs thereon for positioning the fitting member in said exit opening of said body portion for attachment of said fitting to said body portion, said locater lugs including vertically elongated lugs disposed on the interior of said side wall portions at the first mentioned transverse axis and coacting in locating relation with the periphery of said exit opening in said body portion, and including other opposed lugs on said fitting projecting outwardly from said base wall portion at said other transverse axis, the last mentioned lugs being generally arcuate in plan and being adapted for locating coaction with the periphery of said exit opening in said body portion, said locater lugs being disposed interiorly of said transition fitting and in non-interfering relation to said port thereof.

9. The combination in accordance with claim 8 including other valve means coacting with said outlet assembly for controlling the flow of liquid from the interior of said body portion to said outlet assembly via said port.

10. The combination in accordance with claim 8 wherein said base wall portion of said transition fitting includes a valve seat, and a valve means mounted in said body portion including means extending exteriorly of said body portion, for manually controlling the communication of said interior of said body portion with said outlet assembly.

11. The combination in accordance with claim 8 wherein said outlet assembly includes an elbow secured to said transition fitting, and flange means on the exit end of said elbow, for coupling the outlet assembly to another discharge attachment, the last mentioned flange having openings therein adapted for receiving fasteners for attaching said outlet assembly to the other discharge attachment.

* * * * *